(12) United States Patent
Zhou et al.

(10) Patent No.: US 12,271,161 B2
(45) Date of Patent: Apr. 8, 2025

(54) METHOD AND APPARATUS FOR OPTIMIZING OPERATION SIMULATION OF DATA CENTER

(71) Applicant: Tsinghua University, Beijing (CN)

(72) Inventors: Hanchen Zhou, Beijing (CN); Qingshan Jia, Beijing (CN); Xiao Hu, Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 18/404,301

(22) Filed: Jan. 4, 2024

(65) Prior Publication Data

US 2024/0248440 A1    Jul. 25, 2024

(30) Foreign Application Priority Data

Jan. 4, 2023   (CN) .......................... 202310006010.5

(51) Int. Cl.
*G05B 13/04*  (2006.01)
*G05B 13/02*  (2006.01)

(52) U.S. Cl.
CPC ....... *G05B 13/048* (2013.01); *G05B 13/0265* (2013.01)

(58) Field of Classification Search
CPC .......................... G05B 13/048; G05B 13/0265
See application file for complete search history.

(56) References Cited

U.S. PATENT DOCUMENTS

| 7,644,051 | B1 * | 1/2010 | Moore | G05B 13/048 |
|---|---|---|---|---|
|  |  |  |  | 706/903 |
| 2017/0187592 | A1 * | 6/2017 | Ghosh | H04L 43/0817 |
| 2018/0113482 | A1 * | 4/2018 | Vitullo | G06N 20/20 |
| 2021/0287072 | A1 * | 9/2021 | Evans | G06N 3/045 |
| 2021/0405727 | A1 * | 12/2021 | Singh | G06F 1/329 |

* cited by examiner

*Primary Examiner* — Christopher E. Everett
(74) *Attorney, Agent, or Firm* — Nutter McClennen & Fish LLP (57) ABSTRACT

A method and apparatus for optimizing operation simulation of a data center are disclosed, and the method includes: constructing a data center simulation model; acquiring a state data set and an action data set of the data center; inputting the state data set and the action data set into a first state prediction model to obtain a next state data set; judging whether the next state data set meets a state safe judgment condition; if so, inputting the state data set and the action data set into a second state prediction model to obtain a next state data set; optimizing network parameters of a reinforcement learning algorithm; and determining an action data set corresponding to a real-time state data set of the data center by using the trained reinforcement learning algorithm.

15 Claims, 5 Drawing Sheets

METHOD AND APPARATUS FOR OPTIMIZING OPERATION SIMULATION OF DATA CENTER

CROSS-REFERENCE TO RELATED APPLICATION

This application claims priority to Chinese Invention Patent Application NO. 202310006010.5, entitled 'method and apparatus for optimizing operation simulation of data center', and filed on Jan. 4, 2023, which is hereby incorporated by reference in its entirety.

TECHNICAL FIELD

The present disclosure relates to the technical field of the data center simulations, and particularly to a method and apparatus for optimizing operation simulation of a data center.

BACKGROUND

This section is intended to provide the background or context for the embodiments of the present disclosure set forth in the claims. The description here is not admitted to be the prior art just because it is included in this section.

With the rapid development of Internet technologies, the demand for big data computation is growing, and the role of the data center is becoming more and more prominent. In order for the safe operation of the data center, it is critical to ensure that the server works within a safe temperature range.

At present, in order to ensure that the server works within a safe temperature range, an optimal control strategy is usually found by modeling, simulating and solving the physical processes such as the heat generation of a cabinet of the data center and the refrigeration of an air-conditioning system.

However, because many physical processes are involved in the modeling of the data center, the operation simulation of the modeling consume a lot of computing resources. Meanwhile, the selection of the optimal control strategy of the data center requires the evaluation of the effects of various control strategies, which puts forward a higher requirement on the computing of a simulation platform. But in the actual process, the computing resources are extremely limited and the computing time is restricted. Therefore, how to minimize the consumption of the computing resources while ensuring to find out the optimal control strategy of the data center during the operation simulation thereof has become an urgent technical problem to be solved.

SUMMARY

The embodiments of the present disclosure provide a method for optimizing operation simulation of a data center, so as to reduce the consumption of computing resources while ensuring to find out an optimal control strategy of the data center during the operation simulation thereof. The method includes:
constructing a data center simulation model, and the data center simulation model includes a first state prediction model and a second state prediction model; the data center simulation model is configured to provide a simulation environment for a reinforcement learning algorithm; and a precision of the first state prediction model is less than that of the second state prediction model;
acquiring a state data set of the data center and an action data set of the data center, and the state data set includes state data of the simulated data center at any moment, and the action data set includes action data generated according to an action generation rule;
inputting the state data set of the data center and the action data set of the data center into the first state prediction model, to obtain a next state data set predicted by the first state prediction model after executing the action data in the action data set;
judging, based on a preset state safe judgment condition, whether the next state data set predicted by the first state prediction model meets the state safe judgment condition that is set based on a prediction precision of the first state prediction model;
inputting, if the next state data set predicted by the first state prediction model meets the state safe judgment condition, the state data set of the data center and the action data set of the data center into the second state prediction model, to obtain a next state data set predicted by the second state prediction model after executing the action data in the action data set;
optimizing a network parameter of the reinforcement learning algorithm using the next state data set predicted by the second state prediction model, the state data set, and the action data set, to obtain a trained reinforcement learning algorithm; and
determining an action data set corresponding to a real-time state data set of the data center by using the trained reinforcement learning algorithm, and determining the action data set corresponding to the real-time state data set as a control strategy of the data center.

The embodiments of the present disclosure further provide an apparatus for optimizing operation simulation of a data center, so as to reduce the consumption of computing resources while ensuring to find out an optimal control strategy of the data center during the operation simulation thereof. The apparatus includes:
a model construction module configured to construct a data center simulation model, and the data center simulation model includes a first state prediction model and a second state prediction model; the data center simulation model is configured to provide a simulation environment for a reinforcement learning algorithm; and a precision of the first state prediction model is less than that of the second state prediction model;
a data acquisition module configured to acquire a state data set of the data center and an action data set of the data center, and the state data set includes state data of the simulated data center at any moment, and the action data set includes action data generated according to an action generation rule;
a first processing module configured to input the state data set of the data center and the action data set of the data center into the first state prediction model, to obtain a next state data set predicted by the first state prediction model after executing the action data in the action data set;
a judgement module configured to judge whether the next state data set predicted by the first state prediction model meets a preset state safe judgment condition based on the preset state safe judgment condition that is set based on a prediction precision of the first state prediction model;
a second processing module configured to input, if the next state data set predicted by the first state prediction model meets the state safe judgment condition, the state data set of the data center and the action data set of the data center into the second state prediction model, to obtain a next state data set predicted by the second state prediction model after executing the action data in the action data set;

a training module configured to optimize a network parameters of the reinforcement learning algorithm with the next state data set predicted by the second state prediction model, the state data set, and the action data set, to obtain a trained reinforcement learning algorithm; and an action determination module configured to determine an action data set corresponding to a real-time state data set of the data center by using the trained reinforcement learning algorithm; and determine the action data set corresponding to the real-time state data set as a control strategy of the data center.

The embodiments of the present disclosure further provide a computer device, including a memory, a processor and a computer program stored in the memory and executable on the processor, and when executing the computer program, the processor implements the aforementioned method for optimizing operation simulation of the data center.

The embodiments of the present disclosure further provide a computer-readable storage medium storing a computer program, and when executed by a processor, the computer program implements the aforementioned method for optimizing operation simulation of the data center.

The embodiments of the disclosure further provide a computer program product, comprising a computer program, wherein when executed by a processor, the computer program implements the aforementioned method for optimizing operation simulation of the data center.

In the embodiments of the disclosure, a data center simulation model is constructed, which includes a first state prediction model and a second state prediction model. The data center simulation model is configured to provide a simulation environment for a reinforcement learning algorithm, and a precision of the first state prediction model is less than that of the second state prediction model. A state data set of the data center and an action data set of the data center are acquired, and the state data set includes state data of the simulated data center at any moment, and the action data set includes action data generated according to an action generation rule. The state data set of the data center and the action data set of the data center are input into the first state prediction model, to obtain a next state data set predicted by the first state prediction model after executing the action data in the action data set; it is judged whether the next state data set predicted by the first state prediction model meets a state safe judgment condition based on a preset state safe judgment condition that is set based on a prediction precision of the first state prediction model. If the next state data set predicted by the first state prediction model meets the state safe judgment condition, the state data set of the data center and the action data set of the data center are input into the second state prediction model, to obtain a next state data set predicted by the second state prediction model after executing the action data in the action data set. A network parameters of the reinforcement learning algorithm is optimized using the next state data set predicted by the second state prediction model, the state data set, and the action data set, to obtain a trained reinforcement learning algorithm. The trained reinforcement learning algorithm is used to determine an action data set corresponding to the real-time state data set of the data center, and the action data set corresponding to the real-time state data set is determined as a control strategy of the data center. Compared with the technical solution of operation simulation of the data center in the prior art, the next state data of the current state may be quickly determined through the first state prediction model with a low precision, then the actions performed in the current state are screened based on the preset state safe judgment condition, and only an action that passes the screening can be simulated by the second state prediction model with a higher precision, and the network parameter of the reinforcement learning algorithm can be optimized with the simulation data. In this way, it is possible to avoid the evaluation of invalid actions using the second state prediction model with a higher precision, and effectively reduce the consumption of computing resources for an action impossible to be the optimal control strategy, thereby reducing the consumption of computing resources while ensuring to find out the optimal control strategy of the data center during the operation simulation of data center.

BRIEF DESCRIPTION OF THE DRAWINGS

In order to illustrate the technical solutions in the embodiments of the present disclosure or in the prior art more clearly, the drawings to be used the description of the embodiments or the prior art will be briefly introduced below. Obviously, the drawings in the following description only illustrate some embodiments of the present disclosure, and persons of ordinary skill in the art may obtain other drawings from them without paying any creative effort. In the drawings.

DESCRIPTION OF THE EMBODIMENTS

In order that the objectives, technical solutions and advantages of the embodiments of the present disclosure are clearer, the embodiments of the present disclosure are further described in detail as follows with reference to the drawings. Here, the exemplary embodiments of the present disclosure and the description thereof are used to illustrate the present disclosure, rather than being used as limitations thereto.

In the description of the present disclosure, the used terms such as 'include', 'comprise', 'have' and 'contain' are all open terms, which mean including but not limited to. Descriptions referring to the terms such as 'an embodiment', 'a specific embodiment', 'some embodiments' and 'for example' mean that the specific features, structures or characteristics described in conjunction with the embodiment(s) or example(s) are included in at least one embodiment or example of the present disclosure. In the present disclosure, the schematic expressions of the above terms do not necessarily refer to the same embodiment or example. Moreover, the specific features, structures or characteristics described may be combined in any one or more embodiments or examples in a suitable manner. The sequence of steps involved in each embodiment is used to schematically illustrate the implementation of the present disclosure, and the sequence of steps is not limited and may be appropriately adjusted as needed.

Through researches, it is found that at present, most of the modeling and simulation solutions of the data center depict the data center by selected specific modeling methods. The modeling methods mainly include a mechanism-driven method and a data-driven method.

Regarding the mechanism-driven method, generally a physical heat transfer equation and a fluid dynamics model are used to depict the temperature field distribution of the data center, so as to obtain the dynamic process of the temperature change at different positions. This method can finely depict the change process of the temperature field with a higher simulation accuracy. However, too detailed simulation leads to a sharp increase in the computing amount, especially for the problem of large state and action spaces, the huge computing amount required for simulation is often unbearable.

Regarding the data-driven method, a method of a deep learning model is mostly used. For example, it is assumed that an air inflow temperature of the server is jointly determined by the factors such as an air temperature at an inlet of the server, an air outflow temperature of an air-conditioner, a fan speed, a floor opening degree and a distance at a previous moment, and the parameter is learned by means of LSTM (Long short-term memory) or the like, so as to depict a dynamic change process of a thermal environment over time. This rough and simplified modeling method leads to large simulation errors, so that the results are unreliable.

In view of the problems existing in the above two modeling and simulation methods for the data center, the embodiments of the present disclosure provide an optimization solution for modeling and simulation of a data center, which may minimize the consumption of the computing resources while ensuring to find out an optimal control strategy of the data center during the operation simulation of the data center.

Figure 1:
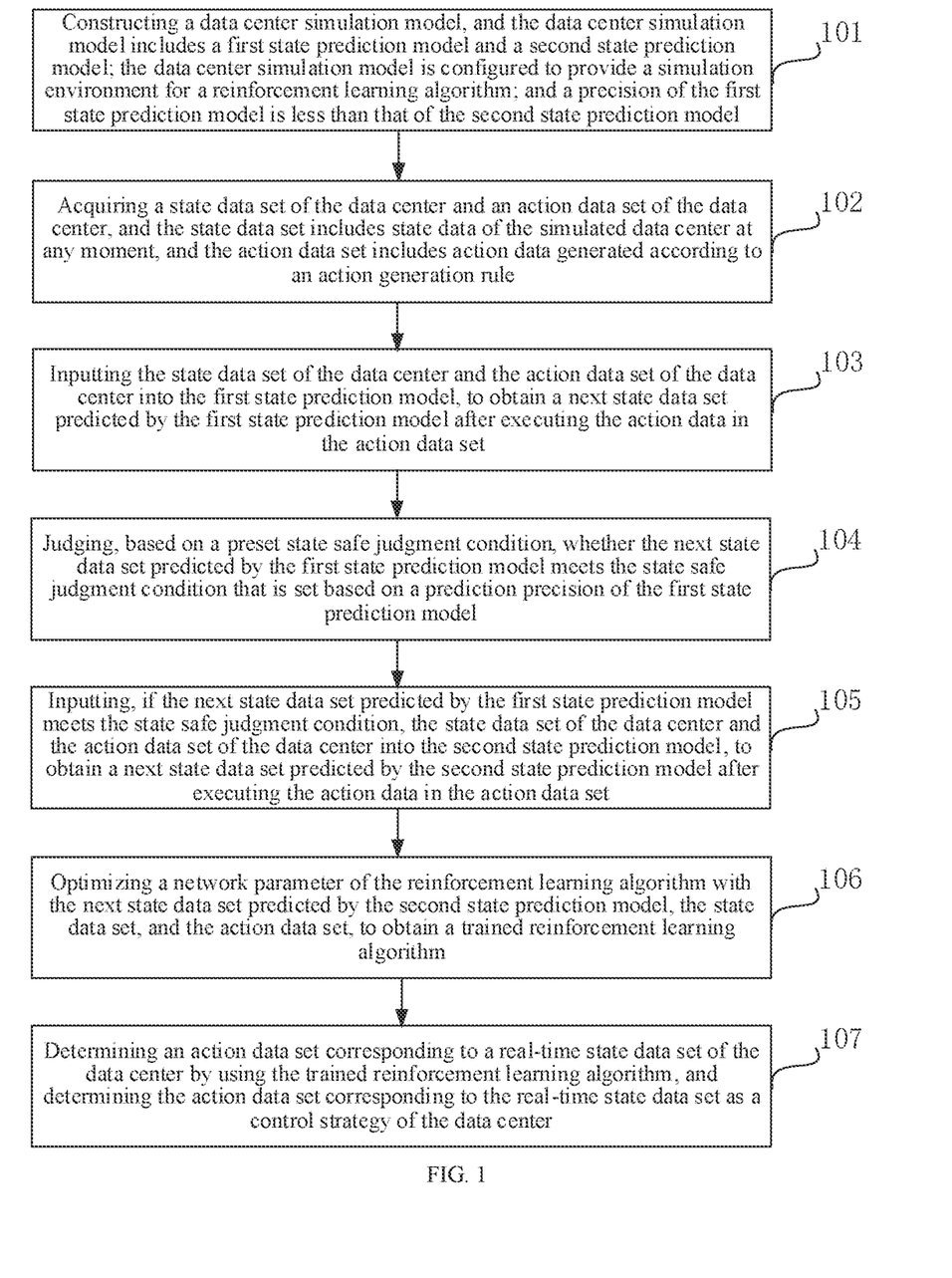
FIG. 1 illustrates a flowchart of a method for optimizing operation simulation of a data center according to an embodiment of the present disclosure.

As illustrated in FIG. 1, which is a flowchart of a method for optimizing operation simulation of a data center according to an embodiment of the present disclosure, and the method may include:

Step 101: constructing a data center simulation model, and the data center simulation model includes a first state prediction model and a second state prediction model; the data center simulation model is configured to provide a simulation environment for a reinforcement learning algorithm; and a precision of the first state prediction model is less than that of the second state prediction model;

Step 102: acquiring a state data set of the data center and an action data set of the data center, and the state data set includes state data of the simulated data center at any moment, and the action data set includes action data generated according to an action generation rule;

Step 103: inputting the state data set of the data center and the action data set of the data center into the first state prediction model, to obtain a next state data set predicted by the first state prediction model after executing the action data in the action data set;

Step 104: judging, based on a preset state safe judgment condition, whether the next state data set predicted by the first state prediction model meets the state safe judgment condition that is set based on a prediction precision of the first state prediction model;

Step 105: inputting, if the next state data set predicted by the first state prediction model meets the state safe judgment condition, the state data set of the data center and the action data set of the data center into the second state prediction model, to obtain a next state data set predicted by the second state prediction model after executing the action data in the action data set;

Step 106: optimizing a network parameter of the reinforcement learning algorithm with the next state data set predicted by the second state prediction model, the state data set, and the action data set, to obtain a trained reinforcement learning algorithm; and Step 107: determining an action data set corresponding to a real-time state data set of the data center by using the trained reinforcement learning algorithm, and determining the action data set corresponding to the real-time state data set as a control strategy of the data center.

In the embodiment of the disclosure, a data center simulation model is constructed, which includes a first state prediction model and a second state prediction model. The data center simulation model is configured to provide a simulation environment for a reinforcement learning algorithm, and a precision of the first state prediction model is less than that of the second state prediction model. A state data set of the data center and an action data set of the data center are acquired, and the state data set includes state data of the simulated data center at any moment, and the action data set includes action data generated according to an action generation rule. The state data set of the data center and the action data set of the data center are input into the first state prediction model, to obtain a next state data set predicted by the first state prediction model after executing the action data in the action data set; it is judged whether the next state data set predicted by the first state prediction model meets a state safe judgment condition based on a preset state safe judgment condition that is set based on a prediction precision of the first state prediction model. If the next state data set predicted by the first state prediction model meets the state safe judgment condition, the state data set of the data center and the action data set of the data center are input into the second state prediction model, to obtain a next state data set predicted by the second state prediction model after executing the action data in the action data set. A network parameters of the reinforcement learning algorithm is optimized with the next state data set predicted by the second state prediction model, the state data set, and the action data set, to obtain a trained reinforcement learning algorithm. The trained reinforcement learning algorithm is used to determine an action data set corresponding to the real-time state data set of the data center, and the action data set corresponding to the real-time state data set is determined as a control strategy of the data center. Compared with the technical solution of operation simulation of the data center in the prior art, the next state data of the current state may be quickly determined through the first state prediction model with a low precision, then the actions performed in the current state are screened based on the preset state safe judgment condition, and only an action that passes the screening can be simulated by the second state prediction model with a higher precision, and the network parameter of the reinforcement learning algorithm can be optimized with the simulation data. In this way, it is possible to avoid the evaluation of invalid actions using the second state prediction model with a higher precision, and effectively reduce the consumption of computing resources for an action impossible to be the optimal control strategy, thereby reducing the consumption of computing resources while ensuring to find out the optimal control strategy of the data center during the operation simulation of data center.

Next, the method for optimizing operation simulation of the data center illustrated in FIG. 1 will be described in detail.

In step 101, it is necessary to construct a data center simulation model.

During implementation, the process of the operation simulation of the data center may be modeled as a Markov decision process, and a state variable of the data center and an action variable of the data center are defined.

In the embodiment of the present disclosure, the state variable may be defined as:

$$S = \{T_{cold}^i, T_{hot}^j, V_k, T_{supply}^{cooling}, T_{return}^{cooling}, T_{supply}^{chilled}, T_{return}^{chilled}\}$$

i=1, 2, . . . , m, and m is the number of temperature measuring points of the cold aisle;
j=1, 2, . . . , n, and n is the number of temperature measuring points of the hot aisle;
k=1, 2, . . . , p, and p is the number of air-conditioners;
where S denotes a state variable set of the data center, $T_{cold}^i$ denotes a temperature variable of a measuring point of each cold aisle, $T_{hot}^j$ denotes a temperature variable of a measuring point of each hot aisle, $V_k$ denotes a fan speed variable of an air-conditioner in a machine room, $T_{supply}^{cooling}$ denotes a supply water temperature variable of cooling water, $T_{return}^{cooling}$ denotes a return water temperature variable of the cooling water, $T_{supply}^{chilled}$ denotes a supply water temperature variable of chilled water, and $T_{return}^{chilled}$ denotes a return water temperature variable of the chilled water.

Next, the action variable may be defined as:

$$A = \{T_{set}^p, F_{cooling}, F_{chilled}\}$$

where $T_{set}^p$ denotes a return air temperature variable of each air-conditioner, $F_{cooling}$ denotes a frequency variable of a cooling pump, and $F_{chilled}$ denotes a frequency variable of a chilled pump.

During implementation, the Markov decision process may refer to: realize a state jump by applying actions in the existing state and calculate a reward, and then use the reinforcement learning algorithm to evaluate and optimize the existing state and the applied actions, so as to select an optimal action and output an optimal strategy, i.e., an optimal action sequence.

In the embodiment of the present disclosure, it is necessary to construct a data center simulation model to provide a simulation environment for a reinforcement learning algorithm. Considering the need to reduce the consumption of the computing resources, the data center simulation model constructed in the embodiment of the present disclosure may include a first state prediction model and a second state prediction model, and a precision of the first state prediction model is less than that of the second state prediction model. It can be understood that the first state prediction model is a crude-precision model, the second state prediction model is a fine-precision model, and the transition from the current state to a next state can be completed using the first state prediction model and the second state prediction model.

During implementation, the second state prediction model (i.e., the fine-precision model) may be a Computational Fluid Dynamics (CFD) simulation model, which has a higher precision and a more accurate simulation result. Since the state variables and the action variables defined above may be continuous values, i.e., the state and action spaces are large, huge computing resources will undoubtedly be consumed if the CFD simulation is used to evaluate all the actions in a certain state.

A considerable part of all the actions applied in a certain state are impossible to occur in actual situations. For example, if an action a is applied in a state s, a next state s' will not satisfy the safe operation requirement of the data center, and obviously, the action a is impossible to be an optimal solution under the state s, so it is unnecessary to use the CFD simulation model to finely evaluate this action. If the actions corresponding to the states that are obviously impossible to be the optimal solution are screened out in advance before running the high-precision simulation (i.e., the compression of the state and action spaces is completed), the computing amount required for the simulation may be greatly reduced, so as to minimize the computing amount while successfully picking out the optimal solution. In order to achieve the above objective, the embodiment of the present disclosure constructs a first state prediction model (i.e., a crude-precision model) to 'screen' the actions.

During implementation, the requirement for the first state prediction model is to quickly compute a state transition, i.e., to complete the update of a thermodynamic process of the data center. In order to minimize the computing amount, a linear model, a nonlinear model or a long and short-term memory neural network model may be selected to estimate the next state.

In an embodiment of the present disclosure, the first state prediction model may be determined by:
acquiring historical state data sets and historical action data sets of the data center in different time periods; and
determining a parameter of the first state prediction model using the historical state data sets and the historical action data sets.

During implementation, in order to accuracy of the data center depicted by the first state prediction model, the parameter of the first state prediction model may be determined by acquiring the historical state data sets collected by a sensor and the historical action data sets applied (executed) to each historical state data set. It should be noted that the historical state data sets may be acquired based on the state variables as defined above when obtaining the historical state data sets, and the historical action data sets may be acquired based on the action variables as defined above when obtaining the historical action data sets.

For example, taking a linear model as an instance, it is possible to learn a fitting parameter w and a fitting function $f$ of the linear model by a system identification method using a historical state data set $S_{history}$ and a historical action data set $A_{history}$, so as to estimate the state having been jumped to after applying different actions by the following formula 1, provided that the current state is known:

$$S' = f(S, A, \omega) \qquad \text{Formula 1}$$

where S' denotes state data after jumping, S denotes state data before jumping, and A denotes action data executed.

In the embodiment of the present disclosure, in order to determine the performance of the first state prediction model, it is necessary to define its precision (accuracy), so as to determine the confidence level of the evaluation result of the new state determined by the first state prediction model. Since the first state prediction model is used to screen actions for the second state prediction model in advance, the second state prediction model may be used to evaluate the precision of the first state prediction model. In the embodiment of the present disclosure, the precision of the first state prediction model may be determined by:

inputting a same historical state data set and a same historical action data set into the first state prediction model and the second state prediction model respectively, to obtain a next historical state data set predicted by the first state prediction model and a next historical state data set predicted by the second state prediction model, after executing action data in the same historical action data set; and determining the precision of the first state prediction model using the next historical state data set predicted by the first state prediction model and the next historical state data set predicted by the second state prediction model.

In the embodiment of the present disclosure, determining the precision of the first state prediction model using the next historical state data set predicted by the first state prediction model and the next historical state data set predicted by the second state prediction model specifically may include:

computing error data of the first state prediction model by the following formula 2, in which the error data of the first state prediction model is inversely proportional to the precision of the first state prediction model:

$$\delta = \frac{\sum_{n=1}^{N} \frac{|P_n - \tilde{P}_n|}{\tilde{P}_n} \times 100\%}{N} \quad \text{Formula 2}$$

where $\delta$ denotes error data of the first state prediction model; $\tilde{P}_n$ denotes an n-th state data in the next historical state data set predicted by the second state prediction model; $P_n$ denotes an n-th state data in the next historical state data set predicted by the first state prediction model, and N denotes a total number of state data in the next historical state data set predicted by the second state prediction model or by the first state prediction model.

During implementation, for the same historical state data set and the same historical action data set, the second state prediction model and the first state prediction model are respectively used to estimate the jumped next historical state data set, and the results are recorded as follows:

$$S_{crude} = \{T_{cold}^i, T_{hot}^j, V_k, T_{supply}^{cooling}, T_{return}^{cooling}, T_{supply}^{chilled}, T_{return}^{chilled}\}$$

$$S_{fine} = \{\tilde{T}_{cold}^i, \tilde{T}_{hot}^j, \tilde{V}_k, \tilde{T}_{supply}^{cooling}, \tilde{T}_{return}^{cooling}, \tilde{T}_{supply}^{chilled}, \tilde{T}_{return}^{chilled}\}$$

Next, each state data in $S_{crude}$ (the next historical state data set predicted by the first state prediction model) and $S_{fine}$ (the next historical state data set predicted by the second state prediction model) is substituted into the above formula 2 to obtain:

$$\delta = \frac{\sum_{n=1}^{7} \frac{|P - \tilde{P}|}{\tilde{P}} \times 100\%}{7}$$

where when the n is valued from 1 to 7, the state data P is valued as $T_{cold}^i$, $T_{hot}^j$, $V_k$, $T_{supply}^{cooling}$, $T_{return}^{cooling}$, $T_{supply}^{chilled}$ and $T_{return}^{chilled}$ in turn, and the state data $\tilde{P}$ is valued as $\tilde{T}_{cold}^i$, $\tilde{T}_{hot}^j$, $\tilde{V}_k$, $\tilde{T}_{supply}^{cooling}$, $\tilde{T}_{return}^{cooling}$, $\tilde{T}_{supply}^{chilled}$ and $\tilde{T}_{return}^{chilled}$ in turn. The precision of the first state prediction model decreases as $\delta$ increases.

In the embodiment of the present disclosure, the precision of the first state prediction model may also be determined in other ways. For example, the precision of the first state prediction model may be determined through a difference between the next state data set predicted by the first state prediction model and a real data set.

In the embodiment of the present disclosure, since the first state prediction model is used to 'screen' the actions, it is necessary to define a specific action screening criterion (i.e., a state safe judgment condition). In the embodiment of the present disclosure, the state safe judgment condition may be set based on the prediction precision of the first state prediction model. Specifically, the state safe judgment condition may be set as follows:

setting the state safe judgment condition, includes: determining a safe value range of the state data, modifying the safe value range of the state data based on the error data of the first state prediction model, and setting the state safe judgment condition based on the modified safe value range of the state data.

During implementation, the safe value range of the state data (the cold aisle temperature and the hot aisle temperature) may be determined based on the specific safe temperature range that the cold aisle and hot aisle of the data center must be in, i.e., it is assumed that the safe value range of the cold aisle temperature is $(T_{cold}^{min}, T_{cold}^{max})$ and the safe value range of the hot aisle temperature is $(T_{hot}^{min}, T_{hot}^{max})$. However, the temperature range finally used to screen the actions cannot be directly defined as the above range for the following two reasons:

(1) Since there is an error in the state data (temperature) estimated by the first state prediction model, if the calculated temperature slightly exceeds the set safe value range, it is impossible to distinguish whether this is caused by an improper action selection or by a computation error of the first state prediction model, so the corresponding action cannot be screened out merely on this basis. Only if the predicted temperature obviously exceeds the set safe value range, it can be considered that the next 'dangerous' state is caused by an 'improper' action at this time, and then this action is screened out.

(2) The reinforcement learning algorithm needs to maximize the cumulative reward, so there is a 'lose' of a single step in exchange for the maximum cumulative reward. Considering the characteristics of the Markova decision process, it is possible that the single step appropriately exceeds the set safe value range (at this time, the reward is small) in exchange for a large reward in the subsequent step, so that the global optimization can be achieved. However, the set safe value range should not be exceeded for a large extent, otherwise the reward lost due to excessive over-temperature in the single step cannot be compensated by the subsequent rewards, and the cumulative reward cannot reach the maximum. Therefore, it can be determined that actions leading to excessive over-temperature are impossible to be a candidate set of optimal actions and should be screened out; and actions leading to appropriate over-temperature should be retained for observation.

To sum up, the safe value range of the state data can be modified based on the error data of the first state prediction model.

During implementation, the safe value range of the state data is modified based on the error data of the first state prediction model, and a mapping of the error data to the safe value range may be constructed by a piecewise function. For example:

It is assumed that the modified safe value range of the cold aisle temperature is $(T_{cold}^{min}-\Delta t, T_{cold}^{max}+\Delta t)$ and the modified safe value range of the hot aisle temperature is $(T_{hot}^{min}-\Delta t', T_{hot}^{max}+\Delta t')$, where a relationship between a temperature elastic range $\Delta t$ and $\Delta t'$, and the error $\delta$ of the first state prediction model is as follows:

$$\Delta t = \begin{cases} t_1, & \text{if } \delta \le a\ \% \\ t_2, & \text{if } a\ \% < \delta \le b\ \% \\ t_3, & \text{if } \delta > b\ \% \end{cases}$$

$$\Delta t' = \begin{cases} t_4, & \text{if } \delta \le c\ \% \\ t_5, & \text{if } c\ \% < \delta \le d\ \% \\ t_6, & \text{if } \delta > d\ \% \end{cases}$$

where the above parameters should satisfy $0 \le t_1 < t_2 < t_3$ and $0 \le t_4 < t_5 < t_6$, and a correspondence relationship between the parameters may be obtained from engineering experiences or data drive.

During implementation, the above modification of the safe value range of the state data based on the error data of the first state prediction model may also construct a complex function with the error data as an independent variable and the safe value range as a dependent variable, so as to depict the relationship therebetween more precisely.

In this way, the data center simulation model is constructed by the above method, and the next state data set predicted by the first state prediction model may be evaluated through the state safe judgment condition to find appropriate action data, so that the second state prediction model performs a more precise simulation.

In step 102, a state data set of the data center at any moment may be randomly simulated based on the defined state variable of the data center (The defined state variable of the data center may be, for example, data corresponding to the state of the data center collected by data interaction with device in the data center, and the device in the data center may include many the air-conditioner, the cold aisle, and the hot aisle, cooling pump, chilled pump and so on), and an action data set may be generated according to the defined action variable of the data center (The defined action variable of the data center may be, for example, data corresponding to the action of the data center collected by data interaction with device in the data center, and the device in the data center may include the air-conditioner, a cooling pump, chilled pump and so on) and the action generation rule of the data center. The state data set and the action data set are simulated by the first state prediction model and the second state prediction model, so that the reinforcement learning algorithm is trained with the state data set, the action data set and the simulation results as sample data.

In this embodiment, the state data set of the data center may include at least one selected from the following state data: a temperature of a measuring point of each cold aisle in the data center, a temperature of a measuring point of each hot aisle, a fan speed of an air-conditioner in a machine room, a supply water temperature of cooling water, a return water temperature of the cooling water, a supply water temperature of chilled water and a return water temperature of the chilled water; and the action data set of the data center may include at least one selected from the following action data: a return air temperature of each air-conditioner, a frequency of a cooling pump and a frequency of a chilled pump.

In step 103, the state data set of the data center and the action data set of the data center are input into the first state prediction model to obtain the next state data set predicted by the first state prediction model after executing the action data in the action data set. Then, step 104 is performed to judge whether the next state data set predicted by the first state prediction model meets the state safe judgment condition. if the next state data set predicted by the first state prediction model meets the state safe judgment condition, step 105 is performed, and the state data set of the data center and the action data set of the data center are input into the second state prediction model to obtain the next state data set predicted by the second state prediction model after executing the action data in the execution action data set.

In the embodiment of the present disclosure, if the next state data set predicted by the first state prediction model does not meet the state safe judgment condition, the action data set may be processed as follows:

the state data set with the action data set using a discard mark to indicate that the action data set is discarded under the state data set, if the next state data set predicted by the first state prediction model does not meet the state safe judgment condition.

During implementation, if the next state data set predicted by the first state prediction model does not meet the state safe judgment condition, the action data set under the state data set is directly 'discarded', and a sample track is interrupted here, so that the subsequent action selection and evaluation are no longer carried out, and the action is marked, so that in the subsequent simulation process of the state data set, the action data set with a discarded mark can be directly skipped, thereby reducing the waste of computing resources. Taking DNQ (Deep Q-learning Network) algorithm as an example, the specific method for marking a discard is to provide a very small constant value to the Q-value of a state action pair (i.e., the state data set and the action data set).

Figure 2:
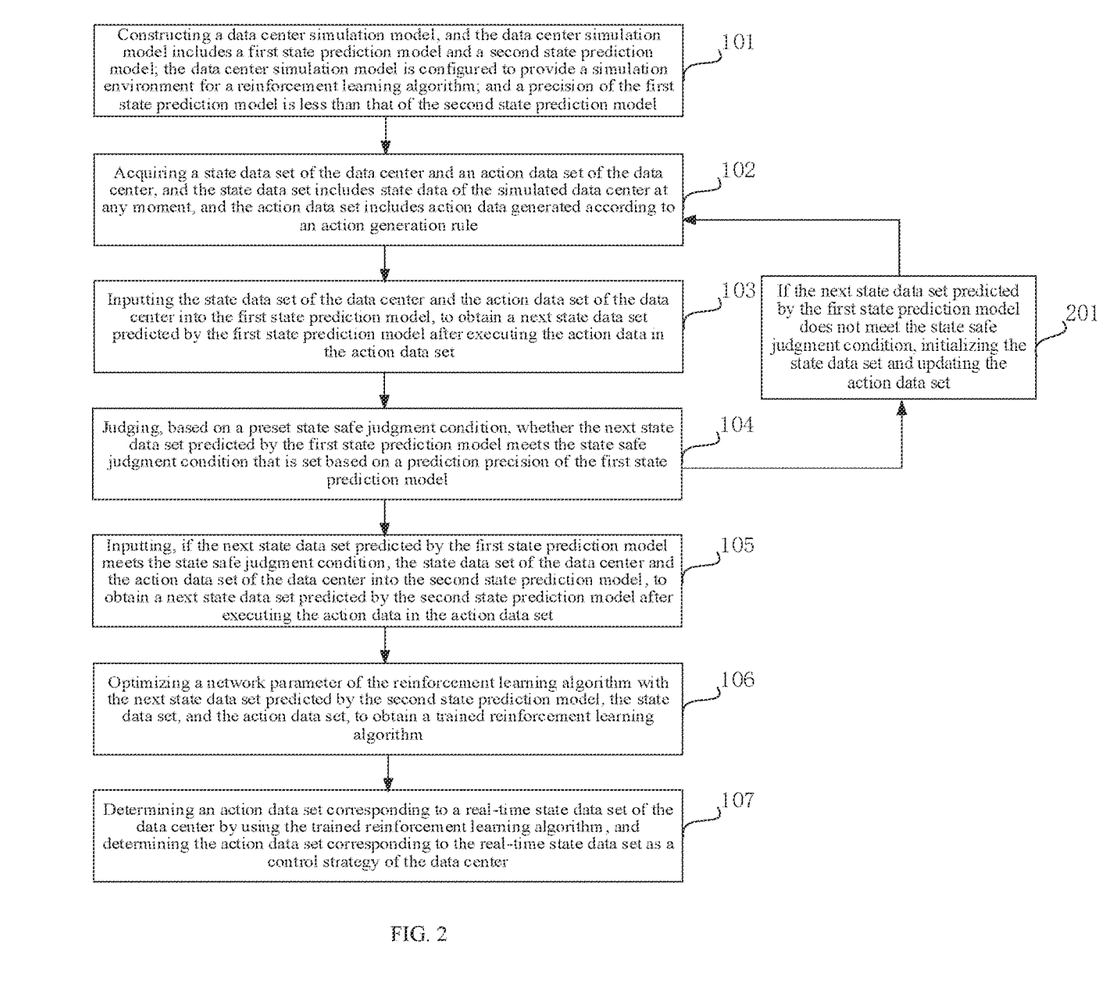
FIG. 2 illustrates a flowchart of method for optimizing operation simulation of a data center according to another embodiment of the present disclosure.

In the embodiment of the present disclosure, if the next state data set predicted by the first state prediction model does not meet the state safe judgment condition, as illustrated in FIG. 2, the method may further include:

performing the following steps iteratively until a next state data set of an initialized state data set predicted by the first state prediction model meets the state safe judgment condition after executing the action data in the updated action data set:

Step 201: initializing the state data set and updating the action data set; and inputting the initialized state data set and the updated action data set into the first state prediction model, to obtain a next state data set of the initialized state data set predicted by the first state prediction model after executing the action data in the updated action data set.

During implementation, step 201 may be understood as skipping to step 102 to initialize the state data set and update the action data set, if the next state data set predicted by the first state prediction model does not meet the state safe judgment condition. It should be noted that the action data set here may be updated based on the 'unmarked' actions under the current state (the initialized state data set). Then, steps 103 and 104 are performed again, and step 105 is performed if the next state data set of the initialized state data set predicted by the first state prediction model meets the state safe judgment condition after executing the action data in the updated action data set; and the method continues to skip to step 102 to perform step 201, if the next state data set of the initialized state data set predicted by the first state prediction model does not meet the state safe judgment condition after executing the action data in the updated action data set.

In step 106, the network parameter of the reinforcement learning algorithm is optimized using the next state data set predicted by the second state prediction model obtained in step 105, the state data set, and the action data set, to obtain a trained reinforcement learning algorithm.

It can be understood that steps 101 to 106 are steps for training the reinforcement learning algorithm. By training the network parameters of the reinforcement learning algorithm using the next state data set predicted by the second state prediction model, the state data set, and the action data set, it is possible to ensure that any data used to training the reinforcement learning algorithm is 'high quality' data passing the screening, so that the optimized parameter may be more accurate.

In step 107, the trained reinforcement learning algorithm is used to determine an action data set corresponding to the real-time state data set of the data center and the action data set corresponding to the real-time state data set is determined as a control strategy of the data center, to control the operating parameters of the corresponding device in the data center (such as the air-conditioner, a cooling pump and so on) based on the control strategy (action data), for example, an operating parameter of each air conditioner is adjusted based on the return air temperature of each air conditioner in the control strategy, an operating parameter of the cooling pump is adjusted based on the frequency of the cooling pump, and an operating parameter of the chilled pump is adjusted based on the frequency of the chilled pump.

During implementation, taking a DQN algorithm as an example, an original DQN algorithm is improved using the method for optimizing operation simulation of the data center mentioned in the embodiments of the present disclosure, and a new DQN algorithm is as follows:

---

New DQN algorithm

1. Input: a learning rate $\alpha$, an exploration rate $\varepsilon$, a current Q-network Q, a target Q-network Q', a size M of an experience pool D, the number n of samples taken from the experience pool each time, a parameter update frequency C of the target Q-network, the number L of initial training steps of an agent to start learning, and a screening range P
2. randomly initialize all parameters $\omega$ of the current Q-network, initialize parameters of the target Q-network $\omega' = \omega$, and empty the experience pool
3. for episode = 1, 2 . . . N do:
4. initialize a state $S_0$, and obtain $\phi_0 = \phi(S_0)$ after preprocessing
5. for t = 0, 1, 2 . . . T do:
6. select an unmarked action $A_t$ under the state $S_t$ according to $\varepsilon$ greedy strategy
7. execute the action $A_t$, substitute into a crude-precision model, roughly compute a next state $S'_{t+1}$, and judge whether a temperature exceeds a screening range P:
8. if 'Yes', mark the action $A_t$, and let $Q(\phi_t, A_t, \omega) = Q'(\phi_t, A_t, \omega') = \rho$, where $\rho$ is a very small constant value, $\phi_t = \phi(S_t)$, and return to step 4;
9. if 'No', perform the following step:
   take the action $A_t$, compute $S_{t+1}$ and $R_t$ using a CFD fine-model, and obtain $\phi_{t+1} = \phi(S_{t+1})$ after preprocessing
10. save $(\phi_t, A_t, R_t, \phi_{t+1})$ into the experience pool D
11. if L > n:
12. randomly sample minibatch with a size of n from the experience pool D:
    $(\phi_j, A_j, R_j, \phi_{j+1})$      j = 1, 2, . . . n
13. for j = 0, 1, 2 . . . n − 1 do:
14. if j + 1 is an end state, then
15. $y_j = R_j$
16. else
    $y_j = R_j + \gamma \max_{a'} Q'(\phi_{j+1}, a', \omega')$
17. compute a loss function $(y_j - Q(\phi_j, a_j, \omega))^2$, perform a gradient descent method, and update the network $\omega = \omega + \alpha \Delta \omega$
18. update the target network $\omega' = \omega$ every C steps

---

Compared with the original DNQ algorithm, the following improvements are made:

(1) Step 1: the screening range P (i.e., the state safe judgment condition) is further added to input to mark the safe value ranges of the cold aisle temperature and the hot aisle temperature;

(2) Step 6: the restriction of 'unmarked action' is added when the $\varepsilon$ greedy strategy is used for action selection, i.e., the Q-value evaluation is no longer performed for the actions determined by the crude-precision model (the first state prediction model) as the 'actions impossible to be a candidate set of optimal actions';

(3) Step 7-9: the crude-precision model is added for pre-evaluation, the 'improper' action is marked with the Q-value set as a very small constant to avoid being selected as the optimal action during decision-making, while the state returns to the initial state; and the 'proper' action continues to be evaluated using the CFD fine-model (i.e., the second state prediction model) to compute the Q-value.

Through the above algorithm, the performance is mainly improved in the following aspects:
(1) By discarding the actions, it avoids the use of the high-precision model to evaluate the invalid actions, and effectively reduces the consumption of simulation resources and the cost of the Q-value training and evaluation for the actions impossible to be an optimal candidate set.
(2) It ensures that the state action pairs put into the experience pool are screened 'high quality' data, so that the parameter fitting is more accurate.

The embodiments of the present disclosure further provide an apparatus for optimizing operation simulation of a data center, as described below. Since the principle of the apparatus to solve the problem is similar to that of the method for optimizing operation simulation of the data center, the implementation of the apparatus can refer to that of the method for optimizing operation simulation of the data center, and the repeated content is omitted here.

Figure 3:
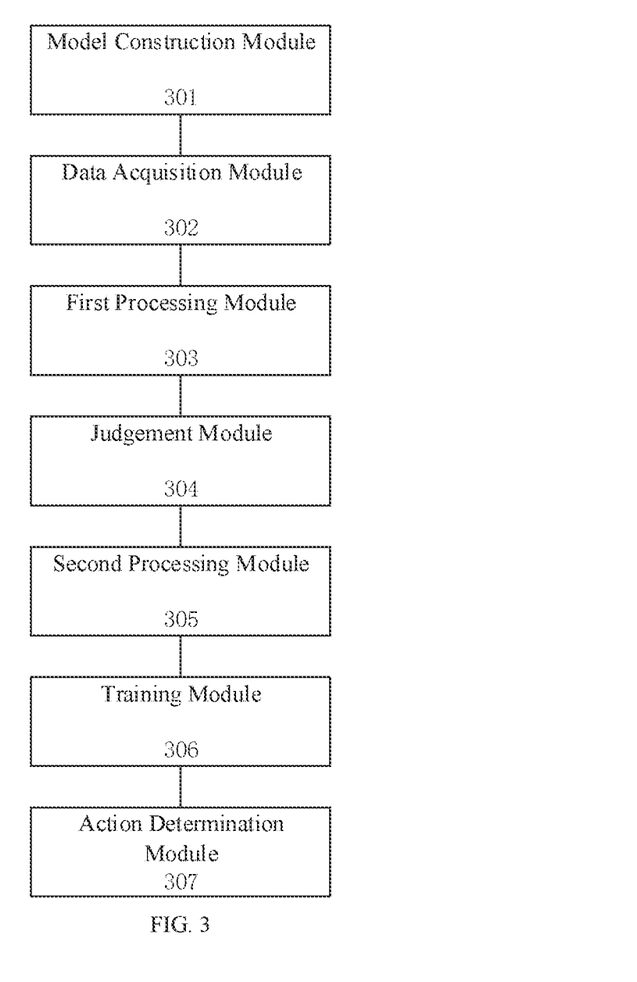
FIG. 3 illustrates a schematic diagram of an apparatus for optimizing operation simulation of a data center according to an embodiment of the present disclosure.

As illustrated in FIG. 3, which is a schematic diagram of an apparatus for optimizing operation simulation of a data center according to an embodiment of the present disclosure, and the apparatus may include:
a model construction module 301 configured to construct a data center simulation model, and the data center simulation model includes a first state prediction model and a second state prediction model; the data center simulation model is configured to provide a simulation environment for a reinforcement learning algorithm, and a precision of the first state prediction model is less than that of the second state prediction model;
a data acquisition module 302 configured to acquire a state data set of the data center and an action data set of the data center, and the state data set includes state data of the simulated data center at any moment, and the action data set includes action data generated according to an action generation rule;
a first processing module 303 configured to input the state data set of the data center and the action data set of the data center into the first state prediction model, to obtain a next state data set predicted by the first state prediction model after executing the action data in the action data set;
a judgement module 304 configured to judge whether the next state data set predicted by the first state prediction model meets a preset state safe judgment condition based on the preset state safe judgment condition that is set based on a prediction precision of the first state prediction model;
a second processing module 305 configured to input, if the next state data set predicted by the first state prediction model meets the state safe judgment condition, the state data set of the data center and the action data set of the data center into the second state prediction model, to obtain a next state data set predicted by the second state prediction model after executing the action data in the action data set;
a training module 306 configured to optimize a network parameter of the reinforcement learning algorithm using the next state data set predicted by the second state prediction model, the state data set, and the action data set, to obtain a trained reinforcement learning algorithm; and
an action determination module 307 configured to determine an action data set corresponding to a real-time state data set of the data center by using the trained reinforcement learning algorithm, and determine the action data set corresponding to the real-time state data set as a control strategy of the data center.

In the embodiment of the present disclosure, the state data set of the data center may include at least one selected from the following state data: a temperature of a measuring point of each cold aisle in the data center, a temperature of a measuring point of each hot aisle, a fan speed of an air-conditioner in a machine room, a supply water temperature of cooling water, a return water temperature of the cooling water, a supply water temperature of chilled water and a return water temperature of the chilled water; and
the action data set of the data center may include at least one selected from the following action data: a return air temperature of each air-conditioner, a frequency of a cooling pump and a frequency of a chilled pump.

In the embodiment of the present disclosure, a marking module may be further included, and the marking module is configured to, after the judging module judges whether the next state data set predicted by the first state prediction model meets the preset state safe judgment condition:
associate the state data set with the action data set using a discard mark to indicate that the action data set is discarded under the state data set, if the next state data set predicted by the first state prediction model does not meet the state safe judgment condition.

Figure 4:
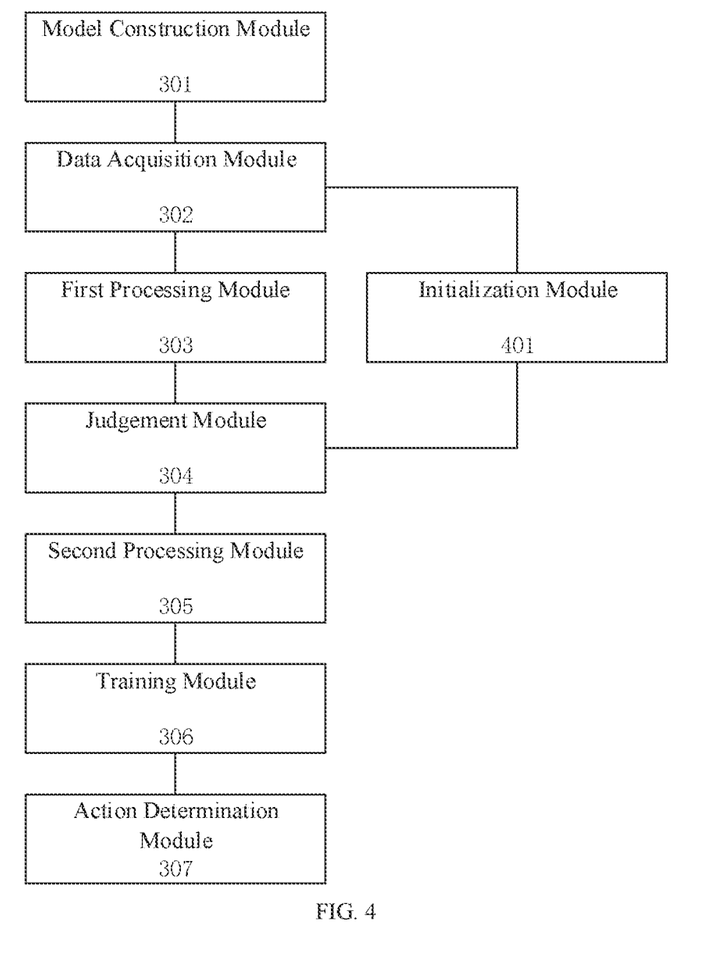
FIG. 4 illustrates a schematic diagram of an apparatus for optimizing operation simulation of a data center according to another embodiment of the present disclosure.

In the embodiment of the present disclosure, as illustrated in FIG. 4, an initialization module 401 may be further included, and the initialization module is configured to, after the judging module judges whether the next state data set predicted by the first state prediction model meets a state safe judgment condition based on a preset state safe judgment condition:
if the next state data set predicted by the first state prediction model does not meet the state safe judgment condition, perform the following steps iteratively until a next state data set of an initialized state data set predicted by the first state prediction model meets the state safe judgment condition after executing the action data in the updated action data set:
initializing the state data set and updating the action data set; and inputting the initialized state data set and the updated action data set into the first state prediction model, to obtain a next state data set of the initialized state data set predicted by the first state prediction model after executing the action data in the updated action data set.

In the embodiment of the present disclosure, a model determination module may be further included, and the model determination module is configured to, before the first processing module inputs the state data set and the action data set of the data center into the first state prediction model to obtain a next state data set predicted by the first state prediction model after executing the action data in the action data set:
Acquire historical state data sets and historical action data sets of the data center in different time periods; and
determine a parameter of the first state prediction model using the historical state data sets and the historical action data sets.

In the embodiment of the present disclosure, a precision determination module may be further included, and the precision determination module is configured to, after the model determination module determines the parameter of the first state prediction model using the historical state data sets and the historical action data sets:
input a same historical state data set and a same historical action data set into the first state prediction model and the second state prediction model respectively, to obtain a next historical state data set predicted by the first state prediction model and a next historical state data set predicted by the second state prediction model, after executing action data in the same historical action data set; and determine the precision of the first state prediction model using the next historical state data set predicted by the first state prediction model and the next historical state data set predicted by the second state prediction model.

In the embodiment of the present disclosure, the precision determination module may be specifically configured to:

compute error data of the first state prediction model by the following formula, and the error data of the first state prediction model is inversely proportional to the precision of the first state prediction model:

$$\delta = \frac{\sum_{n=1}^{N} \frac{|P_n - \tilde{P}_n|}{\tilde{P}_n} \times 100\%}{N}$$

where, $\delta$ denotes error data of the first state prediction model; $\tilde{P}_n$ denotes an n-th state data in the next historical state data set predicted by the second state prediction model; $P_n$ denotes an n-th state data in the next historical state data set predicted by the first state prediction model, and N denotes a total number of state data in the next historical state data set predicted by the second state prediction model or by the first state prediction model.

In the embodiment of the present disclosure, a condition setting module may be further included, and the condition setting module is configured to, after the precision determination module computes the error data of the first state prediction model:

set the state safe judgment condition, including: determining a safe value range of the state data, modifying the safe value range of the state data based on the error data of the first state prediction model, and setting the state safe judgment condition based on the modified safe value range of the state data.

Figure 5:
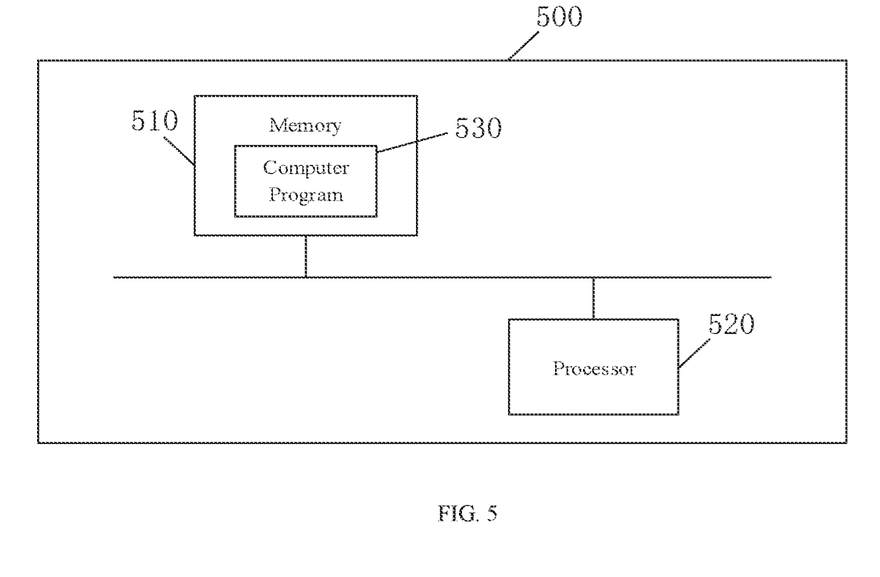
FIG. 5 illustrates a schematic diagram of a computer device according to an embodiment of the present disclosure.

The embodiments of the present disclosure further provide a computer device, as illustrated in FIG. 5, which is a schematic diagram of a computer device according to an embodiment of the present disclosure. The computer device 500 includes a memory 510, a processor 520 and a computer program 530 stored in the memory 510 and executable on the processor 520, and when executing the computer program 530, the processor 520 implements the aforementioned method for optimizing operation simulation of the data center.

The embodiments of the present disclosure further provide a computer-readable storage medium, which stores a computer program, and when executed by a processor, the computer program implements the aforementioned method for optimizing operation simulation of the data center.

The embodiments of the disclosure further provide a computer program product, including a computer program, and when executed by a processor, the computer program implements the aforementioned method for optimizing operation simulation of the data center.

In the embodiment of the disclosure, a data center simulation model is constructed, which includes a first state prediction model and a second state prediction model. The data center simulation model is configured to provide a simulation environment for a reinforcement learning algorithm, and a precision of the first state prediction model is less than that of the second state prediction model. A state data set of the data center and an action data set of the data center are acquired, and the state data set includes state data of the simulated data center at any moment, and the action data set includes action data generated according to an action generation rule. The state data set of the data center and the action data set of the data center are input into the first state prediction model, to obtain a next state data set predicted by the first state prediction model after executing the action data in the action data set; it is judged whether the next state data set predicted by the first state prediction model meets a state safe judgment condition based on a preset state safe judgment condition that is set based on a prediction precision of the first state prediction model. If the next state data set predicted by the first state prediction model meets the state safe judgment condition, the state data set of the data center and the action data set of the data center are input into the second state prediction model, to obtain a next state data set predicted by the second state prediction model after executing the action data in the action data set. A network parameters of the reinforcement learning algorithm is optimized with the next state data set predicted by the second state prediction model, the state data set, and the action data set, to obtain a trained reinforcement learning algorithm. The trained reinforcement learning algorithm is used to determine an action data set corresponding to the real-time state data set of the data center, and the action data set corresponding to the real-time state data set is determined as a control strategy of the data center. Compared with the technical solution of operation simulation of the data center in the prior art, the next state data of the current state may be quickly determined through the first state prediction model with a low precision, then the actions performed in the current state are screened based on the preset state safe judgment condition, and only an action that passes the screening can be simulated by the second state prediction model with a higher precision, and the network parameter of the reinforcement learning algorithm can be optimized with the simulation data. In this way, it is possible to avoid the evaluation of invalid actions using the second state prediction model with a higher precision, and effectively reduce the consumption of computing resources for an action impossible to be the optimal control strategy, thereby reducing the consumption of computing resources while ensuring to find out the optimal control strategy of the data center during the operation simulation of data center.

Persons skilled in the art should appreciate that any embodiment of the present disclosure may be provided as a method, a system or a computer program product. Therefore, the present disclosure may take the form of a full hardware embodiment, a full software embodiment, or an embodiment combining software and hardware. Moreover, the present disclosure may take the form of a computer program product implemented on one or more computer usable storage mediums (including, but not limited to, a magnetic disc memory, CD-ROM, optical storage, etc.) containing therein computer usable program codes.

The present disclosure is illustrated with reference to a flowchart and/or a block diagram of the method, apparatus (system) and computer program product according to the embodiments of the present disclosure. It shall be appreciated that each flow and/or block in the flowchart and/or the block diagram and a combination of flows and/or blocks in the flowchart and/or the block diagram may be realized by computer program instructions. Those computer program instructions may be provided to a general computer, a dedicated computer, an embedded processor or a processor of other programmable data processing device to produce a machine, so that the instructions executed by the processor of the computer or other programmable data processing device produce apparatuses for realizing specified functions in one or more flows in the flowchart and/or one or more blocks in the block diagram.

These computer program instructions may also be stored in a computer readable memory capable of guiding the computer or other programmable data processing devices to work in a particular manner, so that the instructions stored in the computer readable memory can produce manufacture articles including an instructing apparatus which realizes function(s) specified in one or more flows in the flowchart and/or one or more blocks in the block diagram.

These computer program instructions may also be loaded onto the computer or other programmable data processing devices, so that a series of operation steps are performed on the computer or other programmable data processing devices to produce a processing realized by the computer, thus the instructions executed on the computer or other programmable devices provide step(s) for realizing function(s) specified in one or more flows in the flowchart and/or one or more blocks in the block diagram.

The above specific embodiments further make detailed illustrations to the objectives, technical solutions and advantageous effects of the present disclosure. It should be understood that those described above are only specific embodiments of the present disclosure and are not intended to limit the protection scope of the present disclosure. Any modification, equivalent substitution or improvement made within the spirit and principle of the present disclosure should fall within the protection scope of the present disclosure.

What is claimed is:

1. A method for optimizing operation simulation of a data center, comprising:
    constructing, by a processor, a data center simulation model, wherein the data center simulation model comprises a first state prediction model and a second state prediction model;
    the data center simulation model is configured to provide a simulation environment for a reinforcement learning algorithm, and a precision of the first state prediction model is less than that of the second state prediction model;
    acquiring, from the data center, a state data set of the data center and an action data set of the data center, wherein the state data set of the data center comprises state data of the simulated data center at any moment, and the action data set of the data center comprises action data generated according to an action generation rule; wherein the state data set of the data center comprises at least one selected from the following state data: a temperature of a measuring point of each cold aisle in the data center, a temperature of a measuring point of each hot aisle, a fan speed of an air-conditioner in a machine room, a supply water temperature of cooling water, a return water temperature of the cooling water, a supply water temperature of chilled water and a return water temperature of the chilled water; and the action data set of the data center comprises at least one selected from the following action data: a return air temperature of each air-conditioner, a frequency of a cooling pump and a frequency of a chilled pump;
    inputting, by the processor, the state data set of the data center and the action data set of the data center into the first state prediction model, to obtain a next state data set predicted by the first state prediction model after executing the action data in the action data set of the data center;
    judging, by the processor, based on a preset state safe judgment condition, whether the next state data set predicted by the first state prediction model meets the state safe judgment condition that is set based on a prediction precision of the first state prediction model;
    inputting, by the processor, if the next state data set predicted by the first state prediction model meets the state safe judgment condition, the state data set of the data center and the action data set of the data center into the second state prediction model, to obtain a next state data set predicted by the second state prediction model after executing the action data in the action data set of the data center;
    optimizing, by the processor, a network parameter of the reinforcement learning algorithm using the next state data set predicted by the second state prediction model, the state data set of the data center, and the action data set of the data center, to obtain a trained reinforcement learning algorithm;
    determining, by the processor, an action data set corresponding to a real-time state data set of the data center by using the trained reinforcement learning algorithm, and determining the action data set corresponding to the real-time state data set as a control strategy of the data center; and
    controlling, by the processor and based on the control strategy of the data center, the air-conditioner, the cold aisle, the hot aisle, the cooling pump and the chilled pump of the data center.

2. The method according to claim 1, wherein after judging whether the next state data set predicted by the first state prediction model meets the preset state safe judgment condition based on the preset state safe judgment condition, the method further comprises:
    associating the state data set with the action data set using a discard mark to indicate that the action data set is discarded under the state data set, if the next state data set predicted by the first state prediction model does not meet the state safe judgment condition.

3. The method according to claim 1, wherein after judging whether the next state data set predicted by the first state prediction model meets the preset state safe judgment condition based on the preset state safe judgment condition, the method further comprises:
    if the next state data set predicted by the first state prediction model does not meet the state safe judgment condition, performing the following steps iteratively until a next state data set of an initialized state data set predicted by the first state prediction model meets the state safe judgment condition after executing the action data in the updated action data set:
    initializing the state data set and updating the action data set; and inputting the initialized state data set and the updated action data set into the first state prediction model, to obtain a next state data set of the initialized state data set predicted by the first state prediction model after executing the action data in the updated action data set.

4. The method according to claim 1, wherein before inputting the state data set of the data center and the action data set of the data center into the first state prediction model, to obtain a next state data set predicted by the first state prediction model after executing the action data in the action data set, the method further comprises:

acquiring historical state data sets and historical action data sets of the data center in different time periods; and determining a parameter of the first state prediction model using the historical state data sets and the historical action data sets.

5. The method according to claim 1, wherein after determining the parameter of the first state prediction model using the historical state data sets and the historical action data sets, the method further comprises:

inputting a same historical state data set and a same historical action data set into the first state prediction model and the second state prediction model respectively, to obtain a next historical state data set predicted by the first state prediction model and a next historical state data set predicted by the second state prediction model after executing action data in the same historical action data set; and determining the precision of the first state prediction model using the next historical state data set predicted by the first state prediction model and the next historical state data set predicted by the second state prediction model.

6. The method according to claim 5, wherein determining the precision of the first state prediction model using the next historical state data set predicted by the first state prediction model and the next historical state data set predicted by the second state prediction model comprises:

computing error data of the first state prediction model by the following formula, wherein the error data of the first state prediction model is inversely proportional to the precision of the first state prediction model:

$$\delta = \frac{\sum_{n=1}^{N} \frac{|P_n - \tilde{P}_n|}{\tilde{P}_n} \times 100\%}{N}$$

where, $\delta$ denotes error data of the first state prediction model; $\tilde{P}_n$ denotes an n-th state data in the next historical state data set predicted by the second state prediction model; $P_n$ denotes an n-th state data in the next historical state data set predicted by the first state prediction model, and N denotes a total number of state data in the next historical state data set predicted by the second state prediction model or by the first state prediction model.

7. The method according to claim 6, wherein after computing the error data of the first state prediction model, the method further comprises:

setting the state safe judgment condition, comprising: determining a safe value range of the state data, modifying the safe value range of the state data based on the error data of the first state prediction model, and setting the state safe judgment condition based on the modified safe value range of the state data.

8. An apparatus for optimizing operation simulation of a data center, comprising:

at least one memory;
machine readable instructions: and
programmable circuitry to at least one of instantiate or execute the machine readable instructions to:
construct a data center simulation model, wherein the model construction module comprises a first state prediction model and a second state prediction model; the data center simulation model is configured to provide a simulation environment for a reinforcement learning algorithm; and a precision of the first state prediction model is less than that of the second state prediction model;

acquire a state data set of the data center and an action data set of the data center, wherein the state data set of the data center comprises state data of the simulated data center at any moment, and the action data set of the data center comprises action data generated according to an action generation rule; wherein the state data set of the data center comprises at least one selected from the following state data: a temperature of a measuring point of each cold aisle in the data center, a temperature of a measuring point of each hot aisle, a fan speed of an air-conditioner in a machine room, a supply water temperature of cooling water, a return water temperature of the cooling water, a supply water temperature of chilled water and a return water temperature of the chilled water; and the action data set of the data center comprises at least one selected from the following action data: a return air temperature of each air-conditioner, a frequency of a cooling pump and a frequency of a chilled pump;

input the state data set of the data center and the action data set of the data center into the first state prediction model, to obtain a next state data set predicted by the first state prediction model after executing the action data in the action data set of the data center;

judge, based on a preset state safe judgment condition, whether the next state data set predicted by the first state prediction model meets the state safe judgment condition that is set based on a prediction precision of the first state prediction model;

input, if the next state data set predicted by the first state prediction model meets the state safe judgment condition, the state data set of the data center and the action data set of the data center into the second state prediction model, to obtain a next state data set predicted by the second state prediction model after executing the action data in the action data set of the data center;

optimize a network parameter of the reinforcement learning algorithm using the next state data set predicted by the second state prediction model, the state data set of the data center, and the action data set of the data center, to obtain a trained reinforcement learning algorithm;

determine an action data set corresponding to a real-time state data set of the data center by using the trained reinforcement learning algorithm, and determine the action data set corresponding to the real-time state data set as a control strategy of the data center; and control, based on the control strategy of the data center, the air-conditioner, the cold aisle, the hot aisle, the cooling pump and the chilled pump.

9. The apparatus according to claim 8, wherein the programmable circuitry is to: after the judging whether the next state data set predicted by the first state prediction model meets the preset state safe judgment condition:

associate the state data set with the action data set using a discard mark to indicate that the action data set is discarded under the state data set, if the next state data set predicted by the first state prediction model does not meet the state safe judgment condition.

10. The apparatus according to claim 8, wherein the programmable circuitry is to: after the judging whether the next state data set predicted by the first state prediction model meets a state safe judgment condition based on a preset state safe judgment condition:
  if the next state data set predicted by the first state prediction model does not meet the state safe judgment condition, perform the following steps iteratively until a next state data set of an initialized state data set predicted by the first state prediction model meets the state safe judgment condition after executing the action data in the updated action data set:
  initializing the state data set and updating the action data set; and inputting the initialized state data set and the updated action data set into the first state prediction model, to obtain a next state data set of the initialized state data set predicted by the first state prediction model after executing the action data in the updated action data set.

11. The apparatus according to claim 8, wherein the programmable circuitry is to: before the inputting the state data set and the action data set of the data center into the first state prediction model to obtain a next state data set predicted by the first state prediction model after executing the action data in the action data set;
  acquire historical state data sets and historical action data sets of the data center in different time periods; and
  determine a parameter of the first state prediction model using the historical state data sets and the historical action data sets.

12. The apparatus according to claim 11, after the determining the parameter of the first state prediction model using the historical state data sets and the historical action data sets:
  input a same historical state data set and a same historical action data set into the first state prediction model and the second state prediction model respectively, to obtain a next historical state data set predicted by the first state prediction model and a next historical state data set predicted by the second state prediction model, after executing action data in the same historical action data set; and
  determine the precision of the first state prediction model using the next historical state data set predicted by the first state prediction model and the next historical state data set predicted by the second state prediction model.

13. The apparatus according to claim 12, wherein the programmable circuitry is configured to:
  compute error data of the first state prediction model by the following formula, wherein the error data of the first state prediction model is inversely proportional to the precision of the first state prediction model:

$$\delta = \frac{\sum_{n=1}^{N} \frac{|P_n - \tilde{P}_n|}{\tilde{P}_n} \times 100\%}{N}$$

where, δ denotes error data of the first state prediction model; $\tilde{P}_n$ denotes an n-th state data in the next historical state data set predicted by the second state prediction model; $P_n$ denotes an n-th state data in the next historical state data set predicted by the first state prediction model, and N denotes a total number of state data in the next historical state data set predicted by the second state prediction model or by the first state prediction model.

14. The apparatus according to claim 13, wherein in response to computing the error data of the first state prediction model, the programmable circuitry is configured to:
  set the state safe judgment condition, comprising:
    determine a safe value range of the state data, modify the safe value range of the state data based on the error data of the first state prediction model, and set the state safe judgment condition based on the modified safe value range of the state data.

15. A computer device, comprising:
  a memory;
  a processor, coupled to the memory; and
  a computer program stored in the memory and executable on the processor, wherein when executing the computer program, the processor is configured to:
    construct a data center simulation model, wherein the data center simulation model comprises a first state prediction model and a second state prediction model; the data center simulation model is configured to provide a simulation environment for a reinforcement learning algorithm, and a precision of the first state prediction model is less than that of the second state prediction model;
    acquire, from the data center, a state data set of the data center and an action data set of the data center, wherein the state data set of the data center comprises state data of the simulated data center at any moment, and the action data set of the data center comprises action data generated according to an action generation rule; wherein the state data set of the data center comprises at least one selected from the following state data: a temperature of a measuring point of each cold aisle in the data center, a temperature of a measuring point of each hot aisle, a fan speed of an air-conditioner in a machine room, a supply water temperature of cooling water, a return water temperature of the cooling water, a supply water temperature of chilled water and a return water temperature of the chilled water; and the action data set of the data center comprises at least one selected from the following action data: a return air temperature of each air-conditioner, a frequency of a cooling pump and a frequency of a chilled pump;
    input the state data set of the data center and the action data set of the data center into the first state prediction model, to obtain a next state data set predicted by the first state prediction model after executing the action data in the action data set of the data center;
    judge, based on a preset state safe judgment condition, whether the next state data set predicted by the first state prediction model meets the state safe judgment condition that is set based on a prediction precision of the first state prediction model;
    input if the next state data set predicted by the first state prediction model meets the state safe judgment condition, the state data set of the data center and the action data set of the data center into the second state prediction model, to obtain a next state data set predicted by the second state prediction model after executing the action data in the action data set of the data center;
    optimize a network parameter of the reinforcement learning algorithm using the next state data set predicted by the second state prediction model, the state data set of the data center, and the action data set of the data center, to obtain a trained reinforcement learning algorithm;

determine an action data set corresponding to a real-time state data set of the data center by using the trained reinforcement learning algorithm, and determining the action data set corresponding to the real-time state data set as a control strategy of the data center; and control, based on the control strategy of the data center, the air-conditioner, the cold aisle, the hot aisle, the cooling pump and the chilled pump of the data center.

* * * * *